(12) United States Patent
Rheaume et al.

(10) Patent No.: US 12,358,626 B2
(45) Date of Patent: Jul. 15, 2025

(54) AIRCRAFT OVERHEAD LUGGAGE BIN AND METHOD OF MODIFYING SAME

(71) Applicant: MHI RJ Aviation ULC, Boisbriand (CA)

(72) Inventors: Michel Rheaume, Saint Hippolyte (CA); Elio Ruggi, Laval (CA)

(73) Assignee: MHI RJ AVIATION ULC, Boisbriand (CA)

( * ) Notice: Subject to any disclaimer, the term of this patent is extended or adjusted under 35 U.S.C. 154(b) by 0 days.

(21) Appl. No.: 18/590,349

(22) Filed: Feb. 28, 2024

(65) Prior Publication Data

US 2024/0199212 A1  Jun. 20, 2024

Related U.S. Application Data

(62) Division of application No. 17/627,021, filed as application No. PCT/CA2020/051268 on Sep. 23, 2020, now Pat. No. 11,945,587.

(60) Provisional application No. 62/909,945, filed on Oct. 3, 2019.

(51) Int. Cl.
*B64D 11/00* (2006.01)

(52) U.S. Cl.
CPC .................. *B64D 11/003* (2013.01)

(58) Field of Classification Search
CPC ............................ B64D 11/003; E05F 1/1292
See application file for complete search history.

(56) References Cited

U.S. PATENT DOCUMENTS

| 5,395,074 | A | 3/1995 | Hart et al. |
| 5,549,258 | A | 8/1996 | Hart et al. |
| 5,687,929 | A | 11/1997 | Hart et al. |
| 5,921,029 | A | 7/1999 | Stukerjurgen |
| 5,988,565 | A | 11/1999 | Thomas et al. |
| 6,290,175 | B1 | 9/2001 | Hart et al. |

(Continued)

FOREIGN PATENT DOCUMENTS

| EP | 0751064 B1 | 5/2001 |
| WO | 2011007161 A1 | 1/2011 |

(Continued)

OTHER PUBLICATIONS

International Search Report and Written Opinion issued in corresponding International Patent Application No. PCT/CA2020/051268, mailed Dec. 29, 2020 (10 pages).

(Continued)

*Primary Examiner* — Joshua J Michener
*Assistant Examiner* — Ryan Andrew Yankey
(74) *Attorney, Agent, or Firm* — Osha Bergman Watanabe & Burton LLP

(57) ABSTRACT

An overhead luggage bin includes: a bucket including side walls and a belly wall defining a luggage bin interior, a door displaceable between open and closed positions, and a bullnose extending along a forward edge of the belly wall; a hinge bracket fixedly mounted to one of the side walls, the hinge bracket extending between a lower portion mounted to the bullnose and an upper portion having a pivot; and a door displacement mechanism mounted to the door and mounted to the pivot of the hinge bracket, to displace the door to the open position. The hinge bracket has a rear mounting extending between the upper portion and the lower portion, the rear mounting mounted to a forward edge of said one of the side walls of the bucket.

10 Claims, 4 Drawing Sheets

(56) References Cited

U.S. PATENT DOCUMENTS

| | | |
|---|---|---|
| 6,398,163 B1 | 6/2002 | Welch et al. |
| 9,334,055 B2 | 5/2016 | Smith et al. |
| 10,766,621 B2 | 9/2020 | Fette et al. |
| 11,293,208 B2 | 4/2022 | Heimbach |
| 2002/0066826 A1 | 6/2002 | Johnson et al. |
| 2012/0273615 A1 | 11/2012 | Rafler |

FOREIGN PATENT DOCUMENTS

| | | |
|---|---|---|
| WO | 2014127161 A1 | 8/2014 |
| WO | 2018116084 A1 | 6/2018 |

OTHER PUBLICATIONS

Extended European Search Report issued in corresponding European Application No. 20870585.5 dated Sep. 27, 2023 (9 pages).
Non-Final Office Action issued in corresponding U.S. Appl. No. 17/627,021, mailed on Aug. 23, 2023 (17 pages).
Notice of Allowance issued in corresponding U.S. Appl. No. 17/627,021, mailed Dec. 4, 2023 (13 pages).
Notice of Allowance in corresponding Chinese Application No. 202080058488.7, dated Sep. 12, 2024 (7 pages).

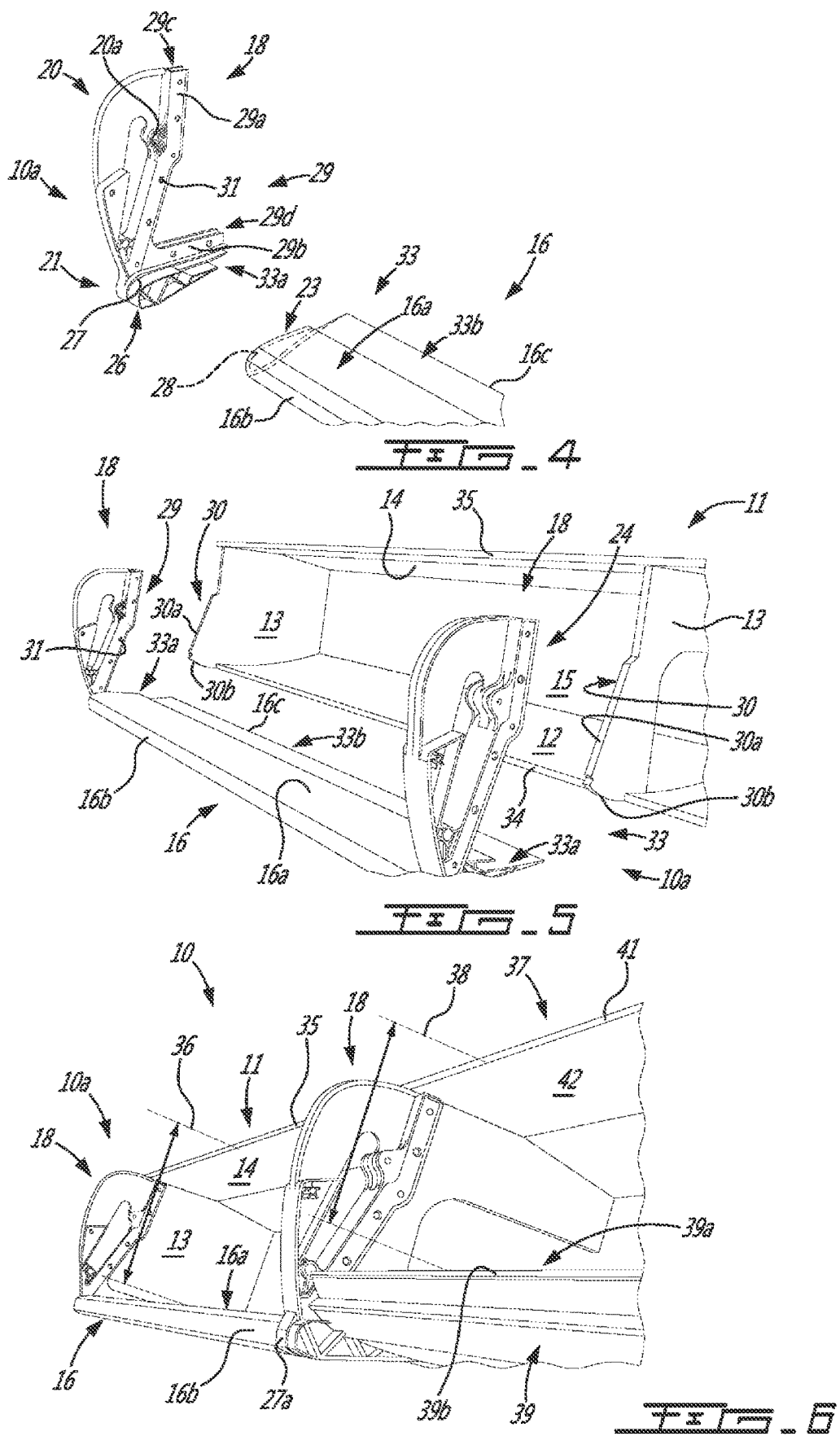

AIRCRAFT OVERHEAD LUGGAGE BIN AND METHOD OF MODIFYING SAME

TECHNICAL FIELD

The application relates generally to aircraft and, more particularly, to overhead luggage bins for aircraft.

BACKGROUND

In an aircraft cabin, space located above seating rows is typically dedicated to overhead bins. Such bins are provided for storing luggage that typically conform to certain requirements applicable to any passenger item carried on board, for example with regard to dimensions and weight. Also, some of these bins have a storage capacity that may be deemed insufficient under certain circumstances. For example, in some cases, a piece of luggage may not fit in some bins, despite conforming to the applicable requirements.

SUMMARY

There is disclosed a method for increasing an existing opening clearance of an overhead luggage bin including a top wall, a belly wall and a bullnose mounted to an existing forward edge of the belly wall, the existing opening clearance being defined between a forward edge of the top wall and a tip of the bullnose, the method comprising: removing the bullnose from the existing forward edge of the belly wall; cutting the belly wall along the existing forward edge to form a new forward edge spaced inwardly into the belly wall from the existing forward edge; and mounting a new bullnose having a new bullnose tip to the new forward edge, a new opening clearance defined between the new bullnose tip and the forward edge of the top wall, the new opening clearance being greater than the opening clearance.

There is disclosed a method of modifying an overhead luggage bin, the method comprising: mounting a bullnose to a forward edge of a belly wall of the overhead luggage bin; mounting a hinge bracket to a side wall of the overhead luggage bin; securing the hinge bracket to the bullnose; mounting a door displacement mechanism to the hinge bracket; and mounting a door to the door displacement mechanism.

There is disclosed an overhead luggage bin, comprising: a bucket including side walls and a belly wall defining a luggage bin interior, a door displaceable between open and closed positions, and a bullnose extending along a forward edge of the belly wall; a hinge bracket fixedly mounted to one of the side walls, the hinge bracket extending between a lower portion mounted to the bullnose and an upper portion having a pivot; and a door displacement mechanism mounted to the door and mounted to the pivot of the hinge bracket, to displace the door to the open position.

There is disclosed a door mounting system mountable to an overhead luggage bin, the overhead luggage bin including a bucket with a belly wall and side walls extending transversely from the belly wall, the door mounting system comprising: a bullnose having a bullnose body extending between a first bullnose end and a second bullnose end, the bullnose body having a trailing edge mountable to the belly wall; and a hinge bracket mountable to one of the side walls of the bucket, the hinge bracket extending between a lower portion mountable to one of the first and second bullnose ends, and an upper portion structured for hingedly mounting a door thereto.

BRIEF DESCRIPTION OF THE DRAWINGS

Reference is now made to the accompanying figures in which:

FIG. 4. is an exploded view of a hinge bracket and a bullnose of the overhead bin of FIG. 3;

FIG. 5 is an exploded view of a bucket of the overhead bin of FIG. 3 and of a hinge bracket and bullnose assembly;

FIG. 6 is a schematic tridimensional view of the overhead bin of FIG. 3 shown with its door removed and disposed adjacent a legacy overhead bin shown with its door removed;

DETAILED DESCRIPTION

Figure 1:
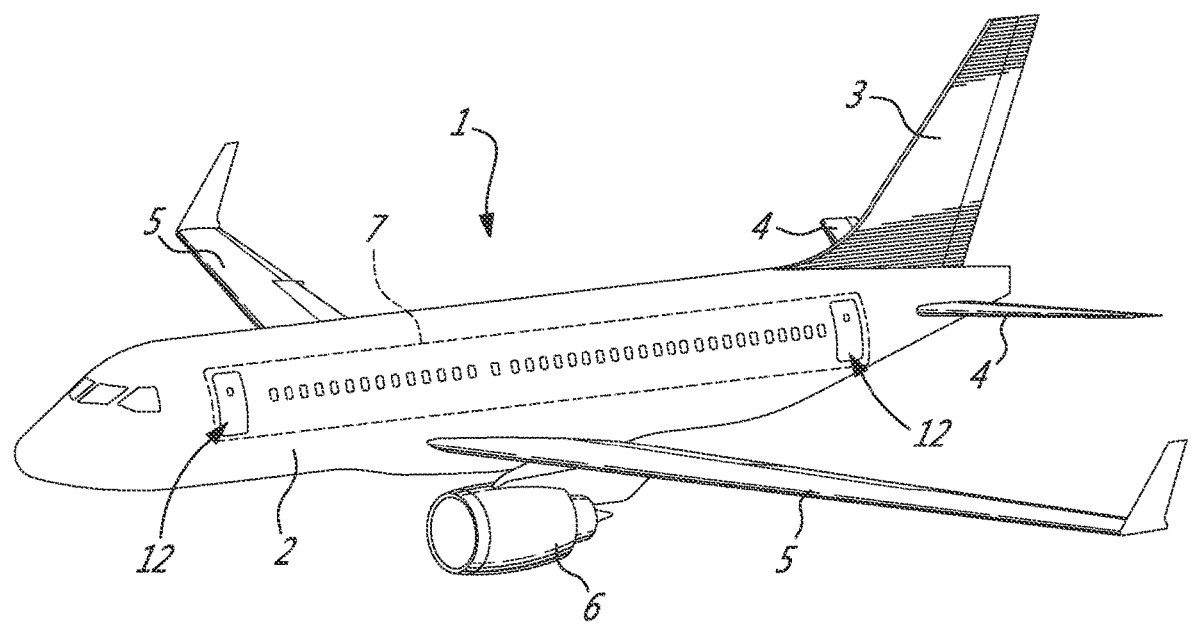
FIG. 1 is a schematic tridimensional view of an aircraft.

Referring to the drawings and more particularly to FIG. 1, an aircraft is shown at 1, and is generally described to illustrate some components in the present disclosure. The aircraft 1 has a fuselage 2 having a fore end at which a cockpit is located, and an aft end supporting a tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the wings 5, although the engines 6 could also be mounted to the fuselage 2. The aircraft 1 is shown as a jet-engine aircraft, but may also be a propeller aircraft. The fuselage 2 defines a cabin 7 generally located between the cockpit and the tail assembly. The aircraft 1 has doors 12 configured to allow ingress to and egress from the cabin 7.

Figure 2:
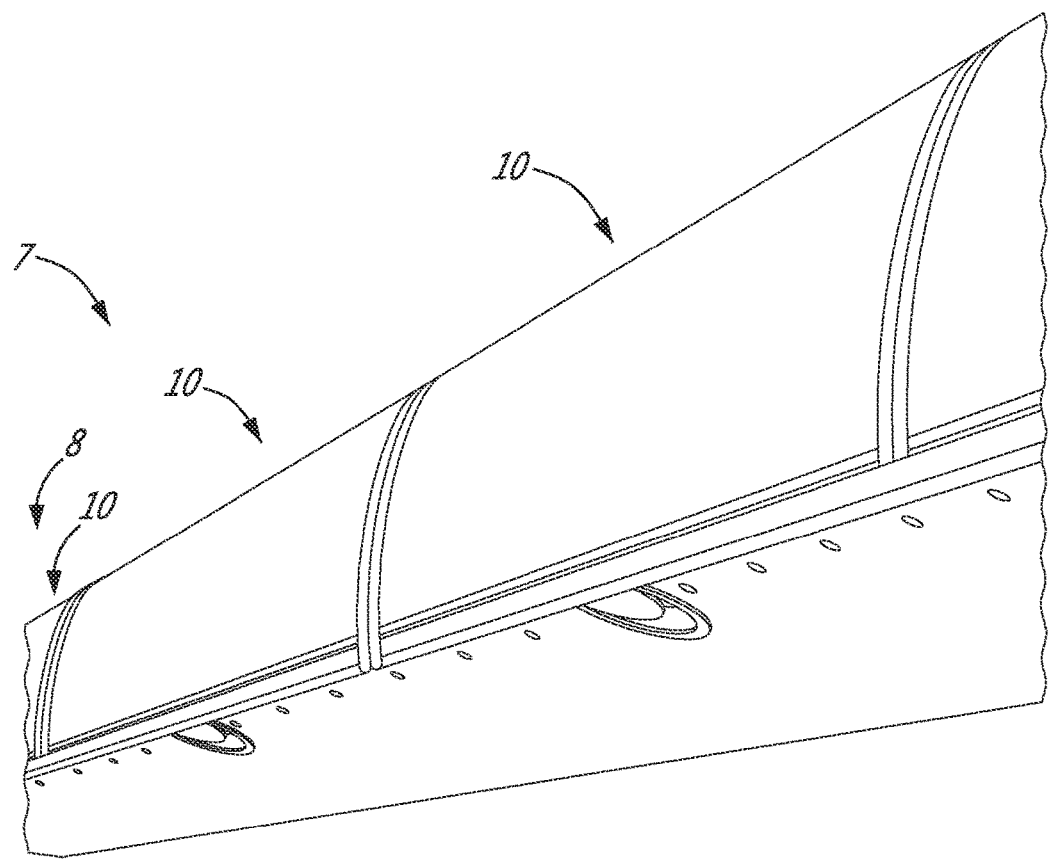
FIG. 2 is a schematic tridimensional view of a portion of a cabin of the aircraft of FIG. 1.

Referring now to FIG. 2, portions of an interior of the cabin 7 are shown. Inside the cabin 7, seating rows (not shown) are disposed so as to form an aisle 8 allowing passage between the fore and aft ends of the fuselage 2. Overhead bins 10 are disposed along either sides of the aisle 8, above the seats of the seating rows, so as to be accessible via the aisle 8. Adjacent overhead bins 10 are connected to one another and to an upper portion of the cabin 7, holding the overhead bins 10 in position.

Figure 3:
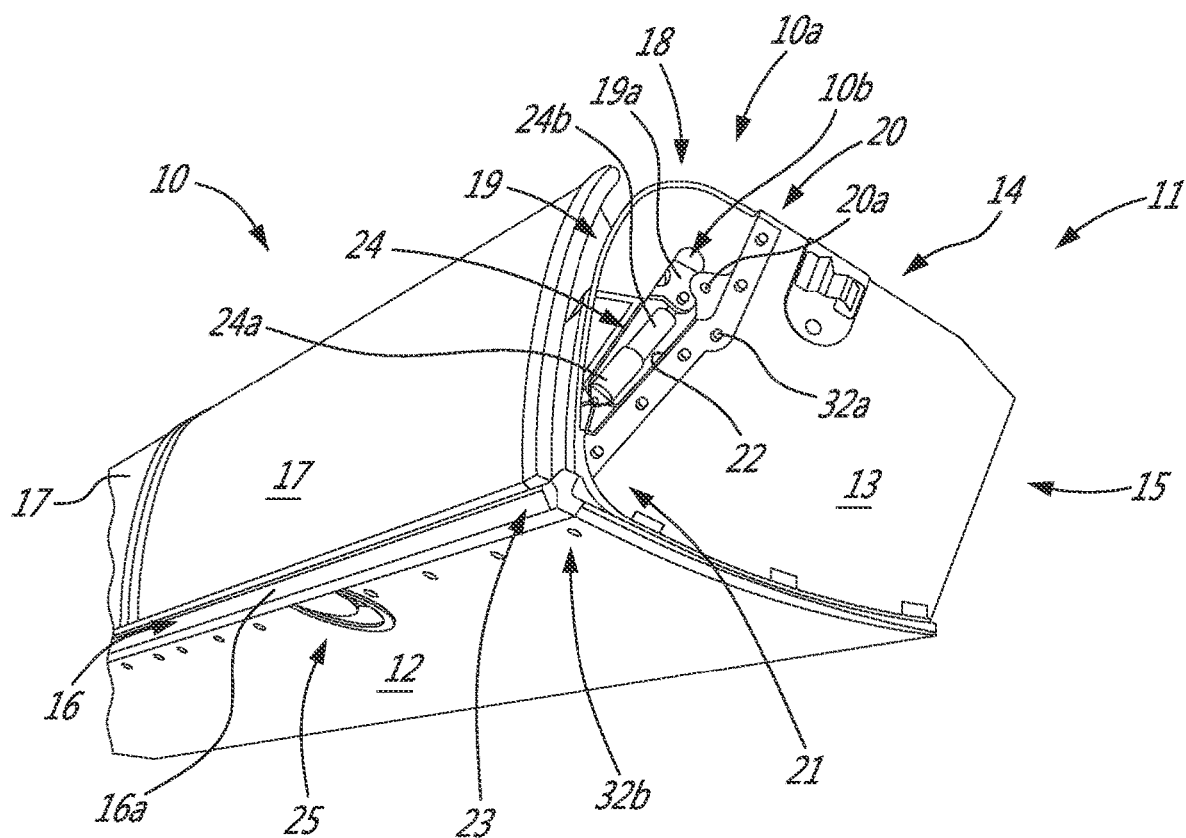
FIG. 3 is a tridimensional view of an overhead bin of the cabin of FIG. 2.

One of the overhead bins 10 is shown in more detail in FIGS. 3-6. Referring to FIG. 3, the overhead bin 10 has a hollow bin body 11 defining an interior space. The bin body 11 includes a belly wall 12 defining a floor or bottom surface of the interior space. Two side walls 13 are disposed at opposite ends of the belly wall 12, extending upwardly therefrom. A top wall 14 extends between the side walls 13 at an upper end of the side walls 13 and defines a ceiling of the interior space. In certain embodiments, the top wall 14 is omitted, and the ceiling of the interior space is defined by the upper portion of the cabin 7. A rear wall 15 of the bin body 11 is transversely connected to the belly wall 12, the side walls 13 and the top wall 14 so as to confine the interior space rearwardly. In certain embodiments, the rear wall 15 is omitted, and the interior space is confined rearwardly by a lateral portion of the cabin 7. In FIG. 3, the bin body 11 is a bucket formed by the belly wall 12, the side walls 13, the top wall 14 and the rear wall 15.

The bin body 11 is positioned inside the cabin 7 such that an open side of the bin body 11 faces the aisle 8. A bullnose 16 is mounted to the belly wall 12 along a forward end of the belly wall 12. The bullnose 16 in the depicted embodiment is a separate component from the belly wall 12 and is meant to be mounted thereto. When mounted to the belly wall 12, the bullnose 16 forms a blunt forward end of the belly wall 12, and serves to protect the forward portion of the belly wall 12 from damage caused by luggage being loaded into the overhead bin 10, and removed therefrom. As best seen in FIG. 5, the bullnose 16 has an elongated bullnose body 16a which narrows in height from a bullnose tip 16b (i.e., a leading edge of the bullnose body 16a) to a trailing edge 16c thereof. When the bullnose 16 is mounted to the belly wall 12, the trailing edge 16c is disposed rearward of the forward end of the belly wall 12, and the bullnose tip 16b forms an apex or tallest portion of the bullnose body 16a. Under typical conditions of use, pieces of luggage skid against the bullnose 16 as they are pushed into the interior space, thereby imparting material loads to the bullnose 16. The bullnose 16 is arranged with respect to the bin body 11 so as to desirably distribute such loads across other components of the overhead bin 10.

In FIG. 3, a door 17 of the overhead bin 10 is shown in a closed position. The door 17 is mounted to the bin body 11 via a door mounting system 10a so as to be positionable between an open position and the closed position to selectively close the interior space. The door mounting system 10a includes a hinge arm 19 projecting from an inner side of the door 17 to form a hinge (i.e., a revolute joint) with a hinge bracket 18. A distal portion 19a of the hinge arm 19 is pivotally connected to an upper portion 20 of the hinge bracket 18 about a pivot 20a of the upper portion 20. The hinge arm 19 is pivotable with the door 17 about the pivot 20a between the open and closed positions.

The hinge bracket 18 also has a lower portion 21. One of the ends 23 of the bullnose 16 is connected to the lower portion 21. A linking member 22 extends between the upper and lower portions 20, 21 so as to locate the door 17 relative to the bullnose 16 via the hinge bracket 18. In this embodiment, the upper portion 20, the lower portion 21 and the linking member 22 form an integral piece. In other embodiments, either one or both of the upper portion 20 and the lower portion 21 may be a distinct piece that connects to the linking member 22.

In the closed position of the door 17, a bottom edge of the door 17 is aligned with the leading edge of the bullnose 16. Also, the bottom edge of the door 17 is positioned in front of the bullnose 16, although the bottom edge of the door 17 may be arranged otherwise with respect to the bullnose 16. From the closed position, an upward displacement of the hinge arm 19 displaces the door 17 to the open position.

Referring to FIG. 3, a linkage 24 is disposed between the hinge arm 19 and the hinge bracket 18. The linkage 24 includes a first portion 24a having a first linkage end and a second portion 24b having a second linkage end. A distance between the first and second linkage ends defines a length of the linkage 24. The first and second portions 24a, 24b of the linkage 24 are configured to be displaceable with respect to one another (in this case linearly) to vary the linkage length within a given range. The first linkage end is connected to the hinge bracket 18 proximate the lower portion 21 and the second linkage end is connected to the hinge arm 19 proximate the distal end of the hinge arm 19. As the door 17 moves from the closed position to the open position, the hinge arm 19 moves upward from the lower portion 21 of the hinge bracket 18 with the second portion 24b of the linkage 24, increasing the linkage length.

It will be appreciated that the bin body 11, the hinge bracket 18, the hinge arm 19 and the linkage 24 are arranged with respect to one another and to the door 17 so as to provide clearance where needed for displacement of the door 17 between the open and closed positions.

In FIG. 3 embodiment, the linkage 24 is a biasing member, e.g. an actuator, arranged to bias the door 17 toward the open position and to oppose displacement of the door 17 toward the closed position. As such, the hinge arm 19 and the biasing member 24 form a door displacement mechanism 10b of the door mounting system 10a. More specifically, the biasing member 24 shown in FIG. 3 is a pneumatic cylinder. The first and second portions 24a, 24b are complementary tube and piston structures of the pneumatic cylinder arranged such that forcing the door 17 toward the closed position compresses gas contained within the pneumatic cylinder as the piston is displaced inside the tube, storing energy within the pneumatic cylinder to bias the door 17 toward the open position upon release of the door 17. Furthermore, a latch 25 is arranged with respect to the door 17 and to the bin body 11 to hold the door 17 in the closed position, and to release the door 17 from the closed position. In alternate embodiments, the linkage 24 is one of a hydraulic cylinder, an electric actuator and a spring and damper assembly. In other embodiments, the linkage 24 is a bar linkage having no actuating function. In yet other embodiments, the linkage 24 is omitted and a door displacement mechanism 10b external to the door mounting system 10 may be provided. In alternate embodiments, other means for holding the door 17 in the closed position relative to the bin body 11 are provided, for example by using the linkage 24 with an electric actuator arranged for selectively displacing the door 17 between the open and closed positions. In such an embodiment, the latch 25 is omitted.

As shown in FIG. 3, the overhead bin 10 has a second door 17, hingedly mounted to the bin body 11 via a second hinge bracket 18. The left-side and right-side hinge brackets 18 are respectively mounted to the left and right side walls 13. It should be noted that the left-side and right-side doors 17 are pivotable independently from one another so as to partially selectively close their respective interior space. Inner walls may be disposed inside the bin body 11 so as to partition the interior space, for example an inner wall located intermediate the left-side and right-side doors 17 so as to define left-side and right-side interior space portions. In a possible embodiment, a single door 17 is mounted to a pair of hinge brackets 18 spaced from one another along a length of the door 17. A hinge bracket 18 may vary slightly from a neighbouring hinge bracket 18 depending on the number of doors 17 supported by the hinge bracket 18.

Turning now to FIG. 4, the bullnose 16 and the left-side hinge bracket 18 are shown isolated from a remainder of the overhead bin 10 and spaced from one another to illustrate interfacing features thereof. For instance, an interface between the hinge bracket 18 and the bullnose 16 is shown. The lower portion 21 of the hinge bracket 18 includes a plug 26 projecting from an inner side (i.e., a side facing toward the interior space of the bin body 11) of the hinge bracket 18. A flange 27 facing away from the inner side of the hinge bracket 18 circumscribes the plug 26. The bullnose 16 is oriented such that its body extends between the inner sides of two consecutive hinge brackets 18, in the depicted embodiment. The bullnose body has a cavity 28 extending inwardly from the left-side bullnose end 23. The cavity 28 is sized such that the plug 26 is insertable into the cavity 28. It should be noted that the plug 26 and the cavity 28 are dimensioned to define a friction fit therebetween. In alternate embodiments, a friction-free fit is defined between the plug 26 and the cavity 28. Also, the left-side bullnose end 23 faces the flange 27 such that the flange 27 is abuttable against the left-side bullnose end 23 upon the plug 26 being inserted in the cavity 28. In some embodiments, a single hinge bracket 18 is mounted to the bullnose 16, at either one of its ends. Furthermore, other means for mounting the hinge brackets 18 to the bullnose 16 are possible. In some embodiments, at least one bullnose end has a plug insertable into a cavity of an adjacent hinge bracket 18. In some embodiments, the plug and the cavity of a hinge bracket 18 and a corresponding bullnose 16 end are omitted. In some such embodiments, the bullnose end 23 is supported on the flange 27 of the hinge bracket 18. In the depicted embodiment, the hinge brackets 18 are mounted to the bullnose 16 such that their respective forward most portions are flush (i.e., generally continuous). For example, as best seen in FIG. 6, a leading edge 27a of the flange 27 is flush with the leading edge 16b of the bullnose 16.

In FIGS. 4 and 5, an interface of the hinge bracket 18 with the side wall 13 of the bin body 11 is shown. A rear side of the hinge bracket 18 forms a rear mounting 29 adapted for mounting the hinge bracket 18 to the side wall 13. Openings 31 defined in the rear mounting 29 are sized to receive fasteners 32a (see FIG. 3) to secure the hinge bracket 18 in place on the bin body 11 upon mounting the hinge bracket 18 to the side wall 13. Concave in shape, the rear mounting 29 is profiled to wrap around a forward edge 30 of the side wall 13. The rear mounting 29 has an upright (i.e. upwardly extending) segment 29a and a transverse segment 29b joined together at a location between the upper and lower portions 20, 21 of the hinge bracket 18. The upright segment 29a defines a slot 29c sized to receive an upper portion 30a of the forward edge 30. The transverse segment 29b defines a slot 29d sized to receive a lower portion 30b of the forward edge 30 of the side wall 13. Rear mountings 29 having different shapes (e.g., rectilinear and convex shapes) and other means for securing the hinge bracket 18 to the bin body 11 are possible, including for example by sizing a portion of the rear mounting 29 and a portion of the side wall 13 so as to define a friction fit therebetween.

An interface between the belly wall 12, the hinge brackets 18, and the bullnose 16 will now be described. A forward edge 34 of the belly wall 12 is insertable into a slot 33 of the door mounting system 10a. The slot 33 has a segment 33a defined in the hinge bracket 18 (i.e., a bracket slot segment 33a) and a segment 33b defined in the bullnose 16 (i.e., a bullnose slot segment 33b) Further, the slot 33 is arranged relative to the belly wall 12 such that inserting the forward edge 34 of the belly wall 12 into the slot 33 mounts the trailing edge 16c of the bullnose 16 to the belly wall 12.

As can be understood from FIG. 5, with the bullnose 16 mounted to the bin body 11, the trailing edge 16c of the bullnose 16 is positioned inwardly of the forward edge 34 of the belly wall 12, and the leading edge 16b of the bullnose 16 is positioned outwardly of the forward edge 34. In the mounted position, a distance between the bullnose 16 and a forward edge 35 of the top wall 13 defines an opening clearance 36 of the overhead bin 10.

The components of the overhead bin 10 having been described, a method of modifying an existing overhead bin is now set forth with reference to FIGS. 6 to 9.

In FIG. 6, a legacy overhead bin 37 and the overhead bin 10 disclosed herein are shown adjacent to one another. In the embodiment shown, the legacy overhead bin 37 has an existing opening clearance 38, while the overhead bin 10 having been modified per the method has the opening clearance 36 that is larger than the existing opening clearance 38. In the depicted embodiment, the existing opening clearance 38 is 9.2 in., and the opening clearance 36 of the overhead bin 10 is 11.1 in. For the legacy overhead bin 37, a legacy bullnose 39 (i.e., an existing bullnose 39 having a body 39a defining a tip 39b) is mounted to an existing belly wall 40 of the legacy overhead bin 37. For both the overhead bin 10 and the legacy overhead bin 37, the opening clearance 36, 38 is a distance between a forward edge 35, 41 of a top wall 13, 42 and the tip 16b, 39b of the bullnose 16, 39.

Figure 7:
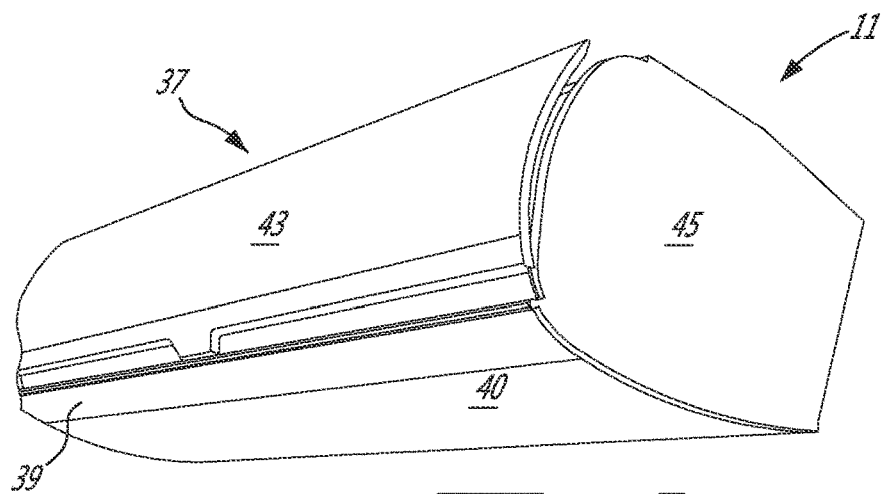
FIG. 7 is a schematic tridimensional view of the legacy overhead bin of FIG. 6 shown with its door in a closed position.
Figure 8:
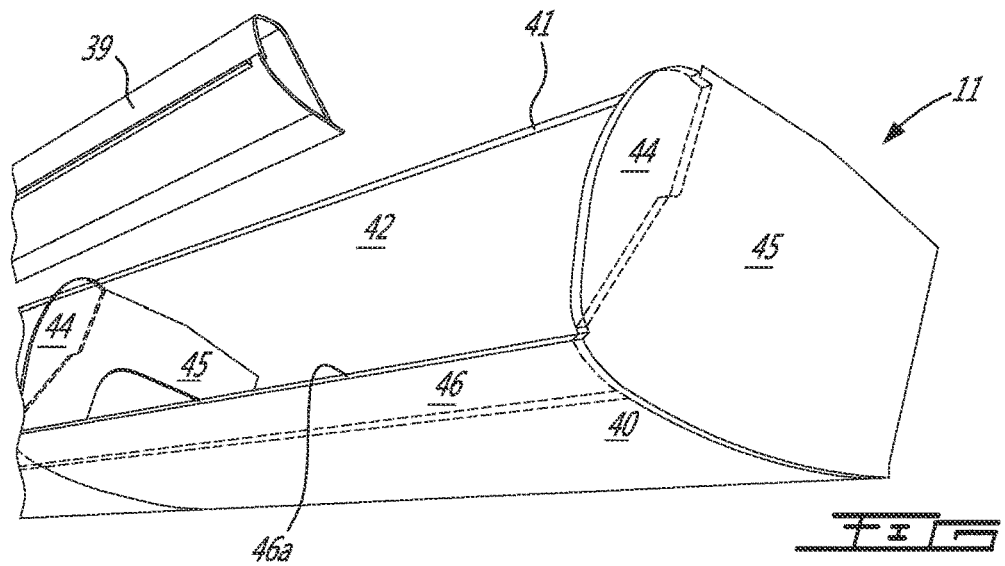
FIG. 8 is a close-up view of the legacy overhead bin of FIG. 6 shown with its door, hinge assembly and bullnose being removed.

Turning now to FIG. 7, an existing door 43 is shown in the closed position, mounted to a bin body 11 of the legacy overhead bin 37 via a hinge assembly (omitted from the figures for clarity). In FIG. 8, the existing door 43 and the hinge assembly are removed from the bin body 11, revealing existing forward portions 44 of the side walls 45 of the bin body 11. The existing bullnose 39 is removed from the belly wall 40, revealing an existing forward portion 46 of the belly wall 40 having an existing forward edge 46a. It will be appreciated that alternatively, the existing bullnose 39 may be removed prior to removal of the existing door 43 and of the hinge assembly.

The method further comprises attaching the door mounting system 10a to the bin body 11, the bullnose 16 and the hinge brackets 18 being in this case a new bullnose 16 and new hinge brackets 18. The new bullnose 16 is mounted to the belly wall 40, and the new hinge brackets 18 are mounted to the side walls 45 (see FIG. 6). In the embodiment shown, the new hinge brackets 18 are secured to the new bullnose 16 before mounting the new bullnose 16 and the hinge brackets 18. Further, it should be noted that the mounting of the new bullnose 16 to the belly wall 40 and the mounting of the hinge brackets 18 to the side walls 45 may be performed simultaneously as forward edges of the belly wall 40 and the side walls 45 are respectively mountable to the rear mountings 29 and the horizontal slot 33.

Figure 9:
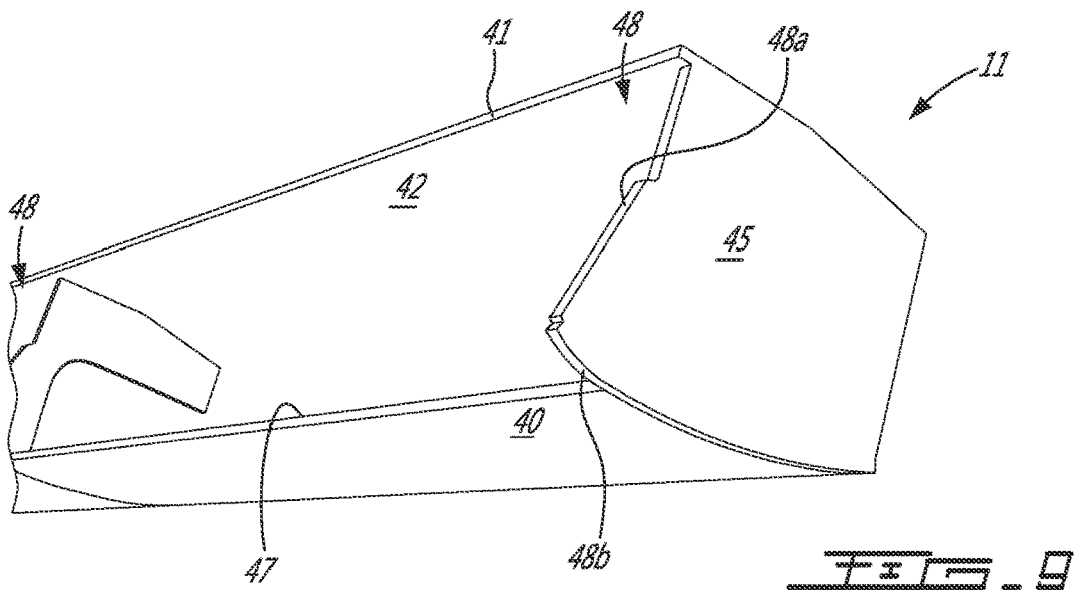
FIG. 9 is a close-up view of a bucket of the legacy overhead bin of FIG. 6, shown with a portion of its belly wall and portions of its side walls removed.

Referring to FIG. 9, the method includes removing the existing forward portion 46 of the belly wall 40 to define a new forward edge 47 of the belly wall 40 between the side walls 45. The existing forward portion 46 is cut such that the new forward edge 47 is spaced inwardly into the belly wall 40 relative to the existing forward edge 46a and shaped so as to be insertable into the horizontal slot 33 (FIG. 5).

In this embodiment, the method also includes removing the existing forward portions 44 of the side walls 45 to define new forward edges 48 of the side walls 45. The existing forward portions 44 are cut such that the new forward edges 48 are insertable into the slots 29c, 29d of the rear mountings 29 (FIG. 4). A forward-facing portion 48a of the new forward edge 48 is formed by the cutting of the side walls 45, and a downward-facing portion 48b of the new forward edge 48 is formed by the cutting of the belly wall 40. It should be noted that the new forward edge 47 of the belly wall 40 is recessed rearward relative to the new forward edges 48 of the side walls 45. Templates may be used to guide cutting of the belly or side walls 40,45, as well as for drilling any holes for fasteners in the assembly.

Once mounted to the side walls 45, the hinge brackets 18 are secured to the side walls 45 via the fasteners 32a (see FIG. 3). In some embodiments, fastening of the hinge brackets 18 is omitted. In some embodiments, the method includes fastening the new bullnose 16 to the belly wall 40, for example via fasteners 32b.

The method also includes assembling a new door 17 to the hinge brackets 18 and assembling the linkages 24 to the door 17 and to the hinge brackets 18. Each one of the linkages 24 is connected between the door and one of the hinge brackets 18. Optionally, assembling the door 17 and/or the linkages with the hinge brackets 18 may be performed before mounting the hinge brackets 18 to the side walls 45. In some embodiments, the method may include assembling the existing door 43 and the hinge assembly to the bin body 11 via the side walls 45 having the new forward edges 48.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. An overhead luggage bin, comprising:
   a bucket including side walls and a belly wall defining a luggage bin interior, a door displaceable between open and closed positions, and a bullnose extending along a forward edge of the belly wall;
   a hinge bracket fixedly mounted to one of the side walls, the hinge bracket extending between a lower portion mounted to the bullnose and an upper portion having a pivot; and
   a door displacement mechanism mounted to the door and mounted to the pivot of the hinge bracket, to displace the door to the open position, wherein
   the hinge bracket has a rear mounting extending between the upper portion and the lower portion, the rear mounting mounted to a forward edge of said one of the side walls of the bucket, and
   the lower portion of the hinge bracket includes a plug extending outwardly from the lower portion, the bullnose defining a cavity extending inwardly from an end of the bullnose, the plug being inserted into the cavity so as to mount the hinge bracket to the bullnose.

2. The overhead luggage bin of claim 1, wherein the lower portion of the hinge bracket includes a flange circumscribing the plug, the flange being abutted against the end of the bullnose having the cavity.

3. The overhead luggage bin of claim 2, wherein a leading edge of the flange is flush with a leading edge of the bullnose.

4. The overhead luggage bin of claim 1, wherein the rear mounting has an upright segment extending between the upper and lower portions and mounted to an upright portion of said side wall, and a transverse segment extending from a lower end of the upright segment, the transverse segment mounted to an underside portion of said side wall.

5. The overhead luggage bin of claim 4, wherein the upright portion of said side wall is disposed in a slot of the upright segment, and the underside portion of said side wall is disposed within a slot of the transverse segment.

6. The overhead luggage bin of claim 1, wherein the side wall is disposed in a bracket slot of the rear mounting.

7. The overhead luggage bin of claim 1, wherein the bullnose has a bullnose slot disposed along a trailing edge of the bullnose, a portion of the belly wall disposed in the bullnose slot.

8. The overhead luggage bin of claim 1, wherein the door displacement mechanism includes a hinge arm extending transversely to the door and mounted thereto, the hinge arm being pivotally connected to the pivot of the hinge bracket.

9. The overhead luggage bin of claim 8, wherein the door displacement mechanism is operable to bias the door toward the open position.

10. The overhead luggage bin of claim 1, wherein the door displacement mechanism includes an actuator extending between a first actuator end connected to the lower portion of the hinge bracket and a displaceable second actuator end connected to the door, the second actuator end being displaceable away from the first actuator end to bias the door to the open position.

* * * * *